(12) United States Patent
    Choudhari (10) Patent No.: US 10,600,061 B2
(45) Date of Patent: Mar. 24, 2020

(54) DETERMINING OPTIMAL RESPONSIVENESS FOR ACCURATE SURVEYING

(71) Applicant: MICROSOFT TECHNOLOGY LICENSING, LLC, Redmond, WA (US)

(72) Inventor: Ankit Choudhari, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 595 days.

(21) Appl. No.: 15/019,063

(22) Filed: Feb. 9, 2016

(65) Prior Publication Data

US 2017/0091787 A1   Mar. 30, 2017

Related U.S. Application Data

(60) Provisional application No. 62/234,443, filed on Sep. 29, 2015.

(51) Int. Cl.
    *G06Q 30/02*      (2012.01)
    *G06F 16/245*     (2019.01)
    (Continued)

(52) U.S. Cl.
    CPC ....... *G06Q 30/0201* (2013.01); *G06F 16/245* (2019.01); *G06Q 10/1097* (2013.01); *G06Q 30/0203* (2013.01); *H04L 63/08* (2013.01)

(58) Field of Classification Search
    None
    See application file for complete search history.

(56) References Cited

U.S. PATENT DOCUMENTS 6,363,411 B1 * 3/2002 Dugan .............. H04M 3/42136
                                           379/201.01
6,363,488 B1 * 3/2002 Ginter .................... G06F 21/10
                                             348/E5.006

(Continued)

FOREIGN PATENT DOCUMENTS

EP       2096598 A2    9/2009
EP       2866184 A1    4/2015

OTHER PUBLICATIONS

"Second Written Opinion Issued in PCT Application No. PCT/US2016/053212", dated Jul. 31, 2017, 7 Pages.

(Continued)

*Primary Examiner* — Thomas L Mansfield
(74) *Attorney, Agent, or Firm* — Michael Best & Friedrich LLP (57) ABSTRACT

Determining an optimal responsiveness for accurate surveying may be provided. In some examples, an application, such as a survey application, may receive a request to present a survey to a participant. Contextual data associated with the participant in relation to the survey may be requested and received from a data service. The contextual data may be analyzed to identify responsiveness conditions to increase a likelihood of participation by the participant in the survey. The responsiveness conditions may include a time duration. The survey application may provide the survey to a client application associated with the participant to prompt the client application to initiate the survey during the time duration.

18 Claims, 7 Drawing Sheets

(51) Int. Cl.
  *G06Q 10/10*   (2012.01)
  *H04L 29/06*   (2006.01)

(56) References Cited

U.S. PATENT DOCUMENTS

| | | | |
|---|---|---|---|
| 6,779,030 B1* | 8/2004 | Dugan | H04M 3/42136 |
| | | | 379/221.08 |
| 6,948,070 B1* | 9/2005 | Ginter | G06F 21/10 |
| | | | 348/E5.006 |
| 8,396,741 B2 | 3/2013 | Kannan et al. | |
| 8,977,764 B1 | 3/2015 | Ramzan et al. | |
| 2005/0021713 A1* | 1/2005 | Dugan | H04M 3/42136 |
| | | | 709/223 |
| 2007/0192161 A1 | 8/2007 | Kogan et al. | |
| 2009/0222343 A1 | 9/2009 | Greene et al. | |
| 2010/0038416 A1 | 2/2010 | Canora | |
| 2010/0122212 A1 | 5/2010 | Boudalier | |
| 2011/0137709 A1 | 6/2011 | Meyer et al. | |
| 2011/0231226 A1* | 9/2011 | Golden | G06Q 20/10 |
| | | | 705/7.32 |
| 2013/0246301 A1 | 9/2013 | Radhakrishnan et al. | |
| 2014/0019201 A1 | 1/2014 | Appel et al. | |
| 2014/0046729 A1 | 2/2014 | Meyer et al. | |
| 2014/0219429 A1 | 8/2014 | Pasquale et al. | |
| 2015/0051957 A1 | 2/2015 | Griebeler et al. | |
| 2016/0019465 A1* | 1/2016 | Milton | H04W 4/029 |
| | | | 706/52 |

OTHER PUBLICATIONS

"International Search Report and Written Opinion Issued in PCT Application No. PCT/US2016/053212", dated Nov. 16, 2016, 11 Pages.

"Measure, Analyse and Improve Customer Satisfaction", Retrieved on: Sep. 17, 2015 Available at: http://www.customersure.com/how-it-works/.

Ugrankar, Amruta, "Seven Ways to Get your Customers to Give Their Feedback", Published on: May 26, 2015 Available at: http://customer360.co/customer-experience/seven-ways-to-get-your-customers-to-give-their-feedback/.

"International Preliminary Report on Patentability Issued in PCT Application No. PCT/US2016/053212", dated Nov. 13, 2017, 8 Pages.

* cited by examiner

DETERMINING OPTIMAL RESPONSIVENESS FOR ACCURATE SURVEYING

CROSS-REFERENCE TO RELATED APPLICATION

This application claims priority under 35 § 119(e) to U.S. Provisional Patent Application Ser. No. 62/234,443 filed on Sep. 29, 2015. The disclosure of the U.S. Provisional Patent Application is hereby incorporated by reference in its entirety.

BACKGROUND

Surveys conducted over the Internet have become increasingly popular. In many online surveys, a user is offered a reward or an incentive, such as a coupon, an enrollment in a contest, and the like, in exchange for completing the online survey. Generally, the user completes the online survey without any supervision by the provider of the survey. Unfortunately, to more quickly obtain the incentive, many unsupervised users complete the online survey by providing inaccurate responses to the survey. In other scenarios, the user may not respond to the survey at all. Ultimately, the success and accuracy of the survey depends upon the user responses. In some examples, marketing strategies may be adjusted based on the user responses. However, if the user responses are inaccurate, the adjusted marking strategy may also be unreliable.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to determining an optimal responsiveness for accurate surveying. In some examples, an application, such as a survey application, may receive a request to present a survey to a participant. Contextual data associated with the participant in relation to the survey may be requested and received from a data service. The contextual data may be analyzed to identify responsiveness conditions to increase a likelihood of participation by the participant in the survey. The responsiveness conditions may include a time duration. The survey application may provide the survey to a client application associated with the participant to prompt the client application to initiate the survey during the time duration.

These and other features and advantages will be apparent from a reading of the following detailed description and a review of the associated drawings. It is to be understood that both the foregoing, general description and the following detailed description are explanatory and do not restrict aspects as claimed.

DETAILED DESCRIPTION

As briefly described above, a determination of art optimal responsiveness for accurate surveying may be provided. In some examples, an application, such as a survey application, may receive a request to present a survey to a participant. Contextual data associated with the participant in relation to the survey may be requested and received from a data service. The contextual data may be analyzed to identify responsiveness conditions to increase a likelihood of participation by the participant in the survey. The responsiveness conditions may include a time duration. The survey application may provide the survey to a client application associated with the participant to prompt the client application to initiate the survey during the time duration.

In other examples, the contextual data may include an identification of the participant, a credential associated with the participant, an organization associated with the participant, and/or a job title of the participant, among other examples. In some examples, the survey application may detect the credential associated with the participant and may compare the credential to a predefined rule. In response to detecting a match between the credential and the predefined rule, the survey application may identify the participant as an administrator and may contact the participant to prompt the participant to modify the time duration associated with an initiation of the survey. The survey application may receive a request from the participant to apply a modification to the time duration to initiate the survey and may apply the modification of the time duration.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspect's may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for determining an optimal responsiveness for accurate surveying. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and one or more processors that includes a server, a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. Actions or operations described herein may be executed on a single processor, on multiple processors (in a single machine or distributed over multiple machines), or on one or more cores of a multi core processor. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that allow the application or service to interact or communicate with one or more other applications and services managed by separate entities.

While example implementations are described using surveys and survey data herein, embodiments are not limited to surveys. Determining an optimal responsiveness for accurate surveying may be implemented in other environments, such as communications, instant messages, data sharing, application sharing, online conferencing, and similar communications, where survey data may be exchanged.

The technical advantages of determining optimal responsiveness for accurate surveying may include, among others, an increased efficiency in application management. Additionally, processing and network bandwidth usage may be reduced and participant interaction may be improved by allowing the participants to receive fewer and more focused surveys.

Embodiments address a need that arises from very large scale of operations created by networked computing and cloud based services that cannot be managed by humans. The actions/operations described herein are not a mere use of a computer, but address results of a system that is a direct consequence of software used as a service such as data services offered in conjunction with surveys.

Figure 1:
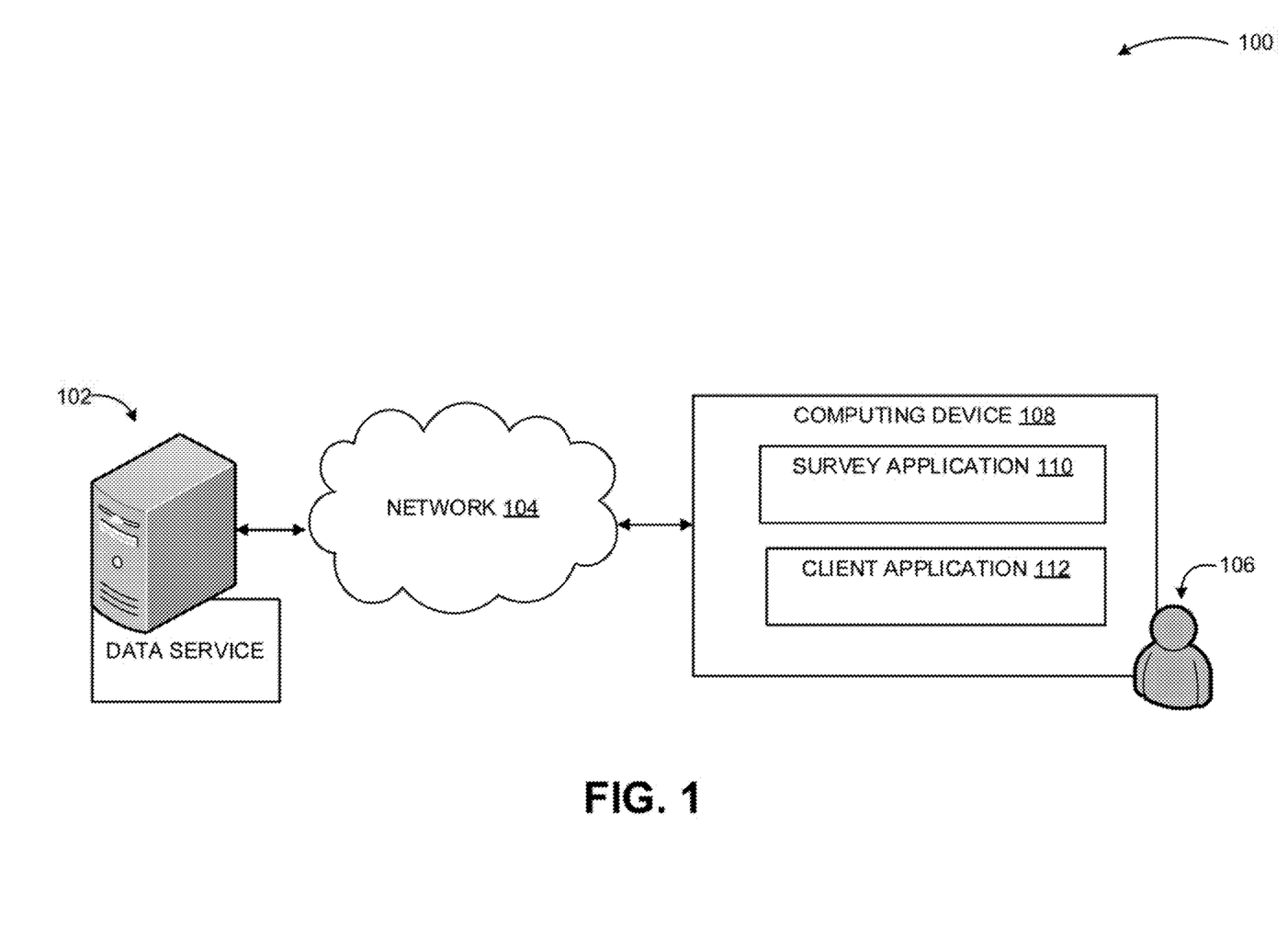
FIG. 1 is a conceptual diagram illustrating, an example computing environment for determining an optimal responsiveness for accurate surveying based on contextual data received from a data service, according to embodiments.

FIG. 1 is a conceptual diagram illustrating an example computing environment for determining an optimal responsiveness for accurate surveying based on contextual data received from a data service, according to embodiments.

As shown in a diagram 100, a computing device 108 may execute a survey application 110. The computing device 108 may include a display device, such as a touch enabled display component, and a monitor, among others, to provide the survey application 110 to a participant 106. The computing device 108 may include a desktop computer, a laptop computer, a tablet, a handheld device, a vehicle mount computer, an embedded computer system, a smart phone, and a wearable computer, among other similar computing devices, for example.

In some examples, the survey application 110 may be provided by a third party service (e.g., a data service 102), web applications, and/or a datacenter, among others. Local access to the survey application 110 may be provided by locally installed rich clients (e.g., a local version of the survey application 110) or generic applications, such as a browser on the computing device 108.

In other examples, the survey application 110 may be executed on a server (e.g., a data server). The server may include a web server or a document server, among others. The computing device 108 (e.g., a local system) may communicate with the server (e.g., a remote system) through a network 104. The network 104 may provide wired or wireless communications between nodes, such as the computing device 108 or the server.

In examples, the survey application 110 may receive a request to present a survey to the participant 106. Companies may use surveys to gain a deeper understanding of their customer's opinions. Results from the surveys may provide both basic demographic information (e.g., an age, an income bracket, and an education level, etc.) and social data (e.g., causes and activities, etc.) of the participant 106. The survey, for example, may include a single question or may be a questionnaire aimed at a target audience to review a product, a brand, or a service, among others. The question(s) may include multiple-choice (e.g., "how would you rate product x on a scale of 1-5 with 1 being 'excellent' and 5 being 'poor'?") and feedback (e.g., "please provide any feedback on how we can improve product x."), among others. Incentives may be given to the participant 106 to complete the survey (e.g., a coupon or an enrollment in a contest, for example).

Then, the survey application 110 may request contextual data associated with the participant 106 in relation to the survey from the data service 102. The contextual data may include, among others, an identification of the participant 106, a credential associated with the participant 106, an organization associated with the participant 106, and/or a job title of the participant 106. In response, the survey application 110 may receive the contextual data associated with the participant 106 from the data service 102. Then, the survey application 110 may analyze the contextual data to identify responsiveness conditions to increase a likelihood of participation by the participant 106 in the survey. The likelihood of participation by the participant 105 in the survey may be increased, for example, by a minimization of deliberate erroneous responses to the survey by the participant 106. For example, the erroneous responses to the survey may include answering "C" to every question in the survey.

Next, the survey application 110 may provide the survey to a client application 112 associated with the participant 106. The survey application 110 may prompt the client application 112 to initiate the survey at the time duration. In some examples, the survey application 110 may allow the participant 106 to interact with the survey through the display device (e.g., the touch enabled display component). In some examples, the survey application 110 may allow the participant 106 to interact with interactive features associated with the survey. The interactive features may include textual features, audio features, and graphical features, among others.

In additional examples, the survey application 110 may receive responses associated with the survey from the participant 106 and may store the responses at the data service 102. The responses may additionally include feedback. The responses may include a rating and/or a review associated with a product, a service, a brand, a company, and/or an organization, among others. A company may review the responses and may modify a marketing strategy to increase sales, for example. The responses may include audio feedback, textual feedback, and/or graphical feedback, among other forms of feedback. In some examples, once the participant 106 responds to a first question, content of a second question may be modified.

While the example system in FIG. 1 has been described with specific components including the computing device 108, the survey application 110, and the data service 102, embodiments are not limited to these components or system configurations and can be implemented with other system configuration employing fewer or additional components.

Figure 2:
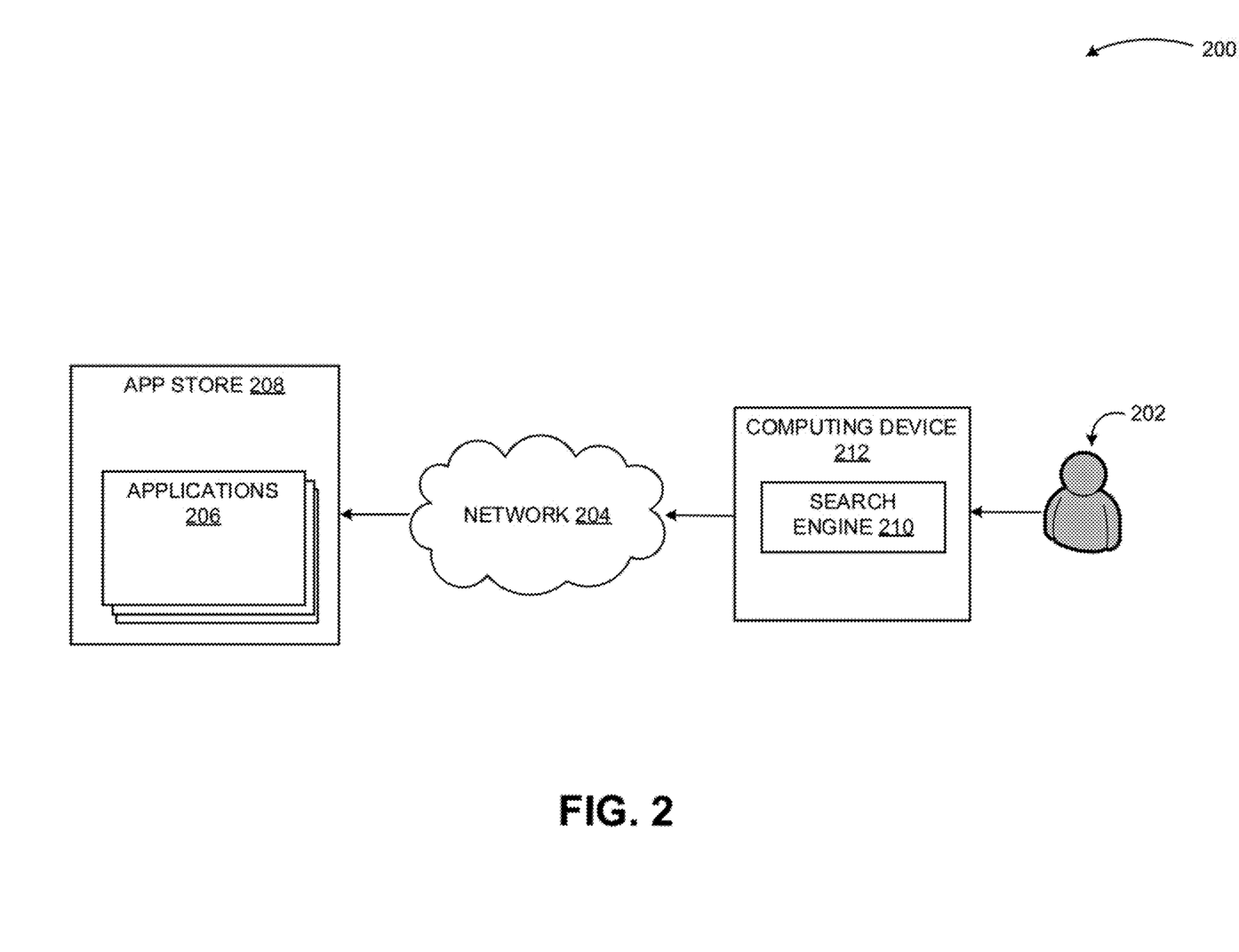
FIG. 2 is a conceptual diagram illustrating an example computing environment for determining an optimal responsiveness for accurate surveying based on contextual data received from an app store, according to embodiments.

FIG. 2 is a conceptual diagram illustrating an example computing environment for determining an optimal responsiveness for accurate surveying based on contextual data received from an app store, according to embodiments.

A diagram 200 illustrates an app store 208 including applications 206. The app store 208 is a marketplace that includes software programs (e.g., the applications 206 and other software programs) that are available for procurement and download. A participant 202 may access the applications 206 over a network 204 by various devices including, but not limited to, a desktop computer, a computing device 212, a smart phone, a tablet device, a wearable device, and so on. In some examples, the app store 208 may be a cloud based service.

In some examples, the participant 202 may provide search criteria to a search engine 210 executed on the computing device 212 to search for one of the applications 206. In some examples, the search engine 210 may be an independent search engine. In other examples, the search engine 210 may be a part of the app store 208.

In some examples, in response to receiving the search criteria from the participant 202, an application 206 may receive a request to present a survey to a participant 202. The application 206 may request and receive contextual data associated with the participant 202 in relation to the survey from the app store 208. Then, the application 206 may analyze the contextual data to identify responsiveness conditions to increase a likelihood of participation by the participant 202 in the survey. In some examples, the responsiveness conditions may include a time duration. Then, the application 206 may provide the survey to a client application executed on the computing device 212. The client application may be associated with the participant 202. In some examples, upgrades and/or updates to installed applications may be configured on the computing device 212 based on the survey results received from the participant 202.

Figure 3:
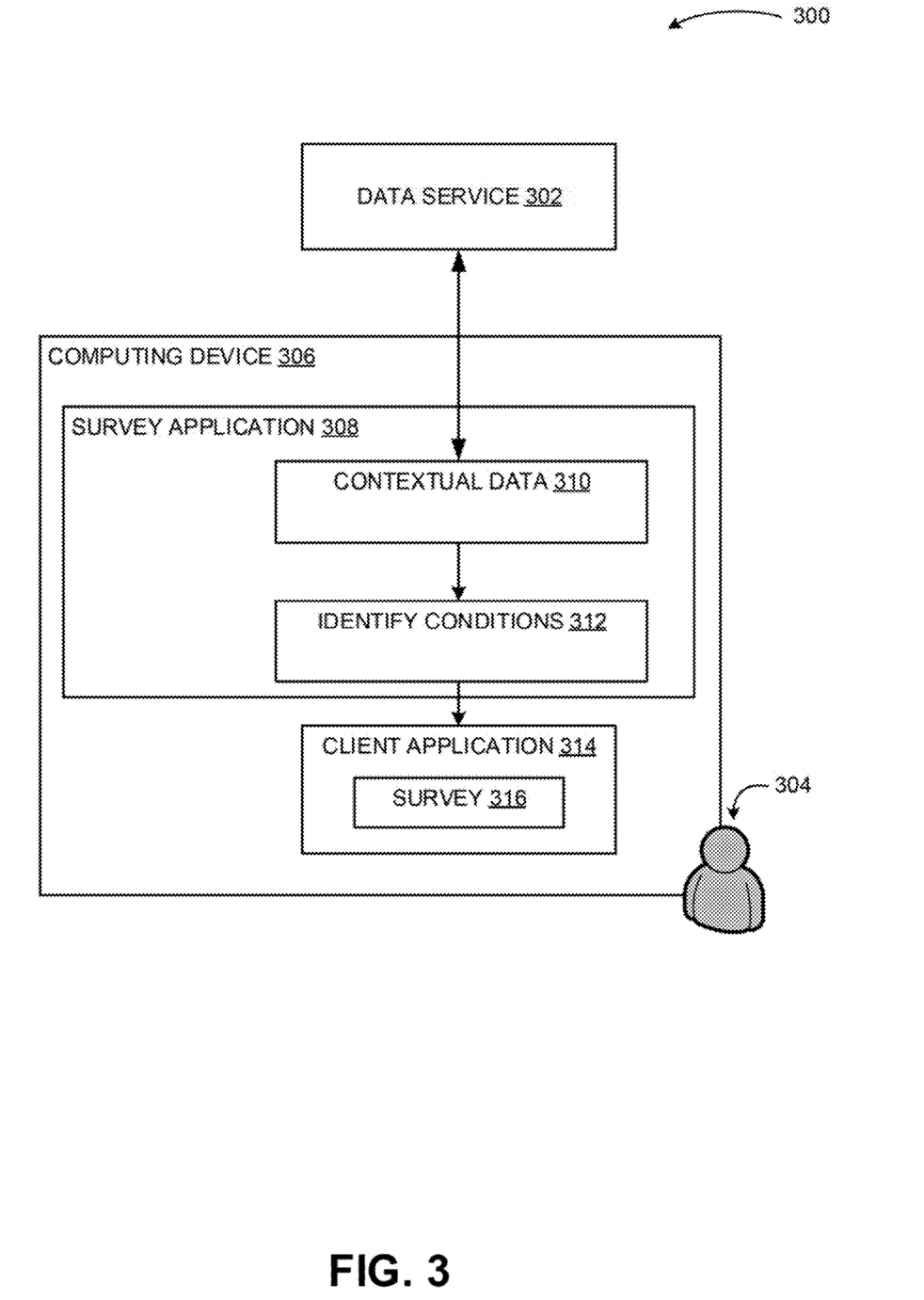
FIG. 3 is a display diagram illustrating a method to determine an optimal responsiveness for accurate surveying based on contextual data received from a data service, according to embodiments.

FIG. 3 is a display diagram illustrating a method to determine an optimal responsiveness for accurate surveying based on contextual data received from a data service, according to embodiments.

As shown in a diagram 300, a computing device 306 may execute a survey application 308. The survey application 308 may include a responsiveness engine and a survey engine, among others. In some examples, the responsiveness engine of the survey application 308 may receive a request to present a survey 316 to the participant 304. The responsiveness engine may request and receive contextual data 310 associated with the participant 304 in relation to the survey 316 from the data service 302. The contextual data 310 may include an identification of the participant 304, a credential associated with the participant 304, an organization associated with the participant 304, and/or a job title of the participant 304, among other examples.

The survey application 308 may then analyze the contextual data 310 to identify responsiveness conditions 312 to increase a likelihood of participation by the participant 304 in the survey 316. The likelihood of participation by the participant 304 in the survey 316 may include a minimization of deliberate erroneous responses to the survey 316 by the participant 304. For example, the erroneous responses to the survey 316 may include answering "C" to every question in the survey 316.

The responsiveness conditions 312 may include a time duration, for example. The time duration may include a time frame during a day of a week (e.g., 10:00 AM-3:00 PM on Thursdays), another time frame spanning two days of the week (e.g., 9:00 AM on Mondays-10:00 AM on Tuesdays), or a time period during another day of the week (e.g., 2:00 PM-4:00 PM on Fridays), among others. Various other examples of the time duration are possible and the list of the examples are not limiting.

In some examples, in response to receiving the contextual data 310 (e.g. a project manager job title) associated with the participant 304, the survey application 308 may analyze the contextual data 310 to identify the responsiveness conditions 312 (e.g., historical usage data associated with the project manager job title) to increase a likelihood of participation by the participant 304 in the survey 316.

In additional examples, the survey application 308 may analyze the responsiveness conditions 312 (e.g., the historical usage data associated with the project manager job title) to identify a usage scenario that may have led to the increased likelihood of participation for a minimization of deliberate erroneous responses to the survey 316) by the participant 304 in the survey 316. An example of the usage scenario may include the survey application 308 providing the survey 316 to the client application 314 associated with the participant 304 on Wednesday at 6:00 PM, as this time period is subsequent work hours and may be preferable to the project manager's time schedule.

In additional examples, the responsiveness engine may receive crowd-sourced data from sources. Crowdsourcing may include outsourcing tasks to a group of individuals and/or communities through an open call through wide-area networks, such as the Internet. Crowdsourcing may be useful when an entity may not have an access to sufficient resources, financial or other, to successfully grow and develop. The sources may include organizations, individuals, and/or groups. The responsiveness engine may analyze the crowd-sourced data to identify the responsiveness conditions 312 to increase the likelihood of participation by the participant 304 in another survey. Then, the survey engine may provide the other survey to the client application 314 to prompt the client application 314 to initiate the other survey. The other survey may include the crowd-sourced data.

In other examples, the responsiveness engine of the survey application 308 may detect the credential of the contextual data 310. The credential may be associated with the participant 304. The responsiveness engine may compare the credential to a predefined rule. The responsiveness engine may detect a match between the credential and the predefined rule. In response, the responsiveness engine may identify the participant 304 as an administrator. The participant 304 may be contacted to prompt the participant 304 to modify the time duration (e.g., 10:00 AM to 11:00 AM on Monday) associated with the initiation of the survey 316. Then, the responsiveness engine may receive a request from the participant 304 to modify the time duration (e.g., 10:00 AM to 11:00 AM on Monday) to initiate the survey 316. In response, the responsiveness engine may modify the time duration from 10:00 AM to 11:00 AM on Monday to 10:30 AM to 11:30 AM on Monday, for example.

In other examples, the responsiveness engine of the survey application 308 may receive another request to present another survey to another participant. The other participant may have the same credentials as the participant 304 (e.g., the other participant may also be an administrator). In response, the responsiveness engine may receive other contextual data associated with the other participant in relation to the other survey from the data service 302. Next, the responsiveness engine may identify a subset of attributes associated with the contextual data 310 and additionally associated with the other contextual data. The subset of the attributes may include a priority, a subject matter, and/or a time stamp, among other examples. The responsiveness engine may then analyze the other contextual data to identify the responsiveness conditions 312 to increase the likelihood of participation in the other survey. The responsiveness conditions 312 may include another time duration. The survey engine of the survey application 308 may provide the other survey to the client application 314 associated with the other participant 304 to prompt the client application 314 to initiate the other survey at the other time duration. In other examples, the other participant may not share the same credentials as the participant 304 (e.g., the other participant may be an employee and may not be enabled to modify the time duration associated with the survey 316).

Figure 4:
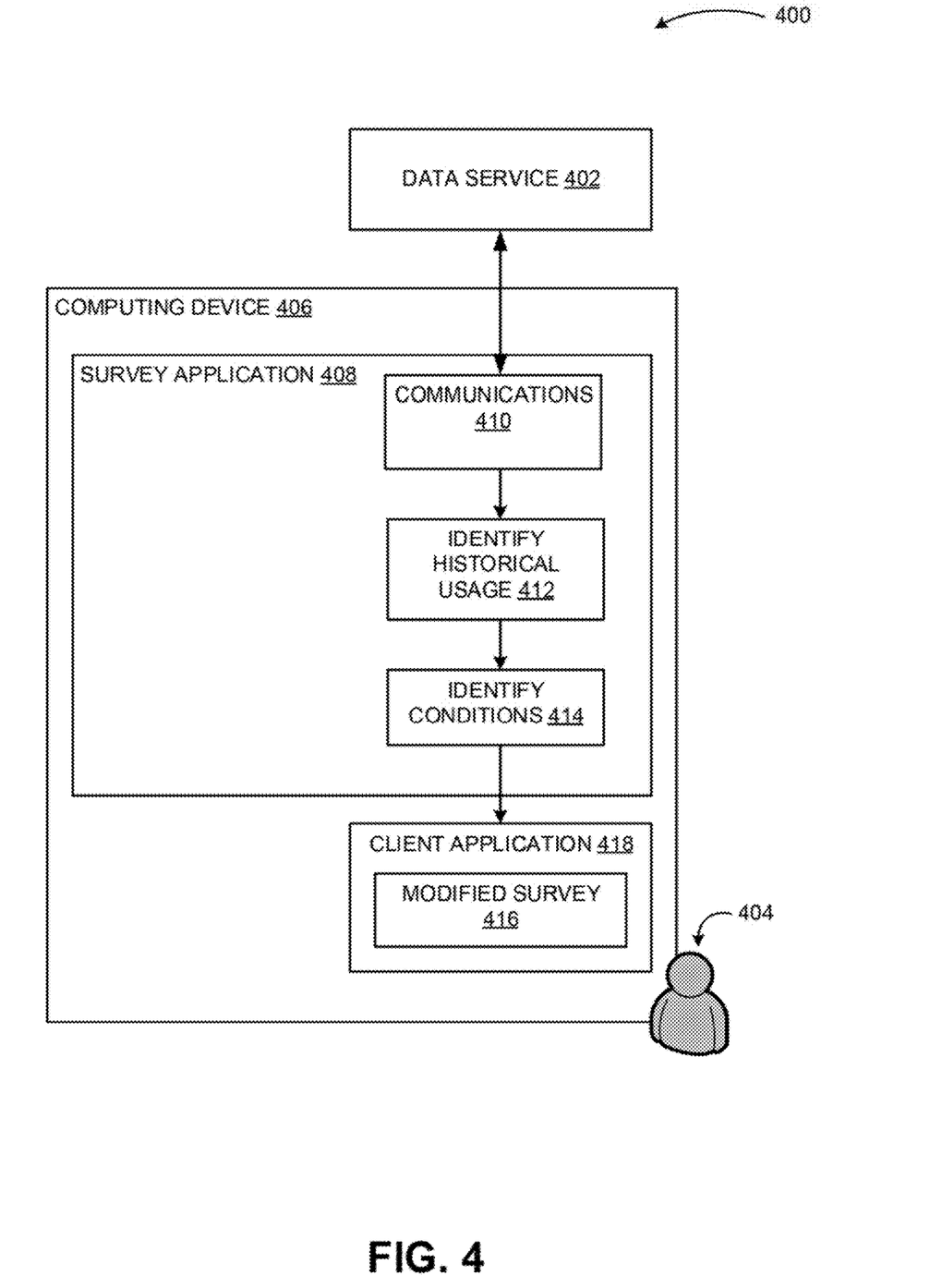
FIG. 4 is a display diagram illustrating a method to determine an optimal responsiveness for accurate surveying based on communications received from a data service, according to embodiments.

FIG. 4 is a display diagram illustrating a method to determine an optimal responsiveness for accurate surveying based on communication received from a data service, according to embodiments.

As shown in a diagram 400, a computing device 406 may execute a survey application 408. In some examples, the survey application 408 may be provided by a data service 402. The survey application 408 may then analyze the contextual data to identify responsiveness conditions 414 to achieve an increased likelihood of participation by the participant 404 in the survey.

In further examples, the responsiveness engine of the survey application 408 may perform a statistical computation or an algorithm between the responsiveness conditions 414 or between a subset of the responsiveness conditions 414 to predict an accuracy of the response to the survey. For example, the survey application 408 may perform a statistical computation e.g., stratified random sampling) between the responsiveness conditions 414 to predict the accuracy of the response to the survey.

In another example, the survey application 408 may perform a pattern matching algorithm (e.g., the Knuth-Morris-Pratt algorithm, and the Boyer-Moore algorithm, etc.) between the responsiveness conditions 414 or between the subset of the responsiveness conditions 414 to predict the accuracy of the response to the survey. The pattern matching algorithm may determine if the participant 404 provided the same answer to all of the questions in a particular series (e.g., provided the answer "B" to all of the questions, provided the answer "1" to all of the questions, etc.) or to a few questions in the particular series e.g., provided the answer "excellent" to three questions in a row).

The survey application 408 may perform a reverse logic algorithm between the responsiveness conditions 414 or between the subset of the responsiveness conditions 414 to predict the accuracy of the response to the survey. The survey application 408 may utilize the survey to ask a first question to the participant 404, such as, "How much do you like the color of a product?" The survey application 408 may utilize the survey to ask a second question to the participant 404, such as, "How much did you dislike the color of the product?" The survey application 408 may then detect consistencies or discrepancies between the two responses. The survey application 408 may also receive feedback associated with the survey from the participant 404. The feedback may include textual feedback, audio feedback, and/or graphical feedback, among other forms of feedback.

In other examples, the survey application 408 may additionally analyze the accuracy of the response to the survey by examining a time period utilized by the participant 404 to complete the survey. For example, the survey application 408 may determine a threshold amount of time to complete the survey (e.g., thirty minutes). The survey application 408 may detect a participant completion time of the survey in ten minutes. Next, the survey application 408 may compare the threshold amount of time to complete the survey (e.g., thirty minutes) to the participant completion time of the survey (e.g., ten minutes). In response to a determination that the participant completion time of the survey (e.g., ten minutes) is less than the threshold amount of time to complete the survey (e.g., thirty minutes), the survey data may be labeled as erroneous survey data and may be discarded. In other scenarios, for example, if the survey application 408 identifies the participant 404 as an administrator, the survey application 408 may enable the participant 404 to modify the threshold amount of time to complete the survey.

In some examples, the responsiveness engine of the survey application 408 may receive a communication 410 associated with the participant 404 from the data service 402. The communication 410 may include emails, online calendar invites, attachments associated with the emails, and/or text messages, among others. The responsiveness engine may extract the responsiveness conditions 414 from the communication 410. The responsiveness conditions 414 may include historical usage data 412 associated with the communication 410, a tone of exchange within the communication 410, a global positioning system (GPS) location associated with the communication 410, and/or a subject matter associated with the communication 410, among others. Then, to enhance participation in the survey by the participant 404, the responsiveness engine may modify the survey based on the responsiveness conditions 414. Then, the responsiveness engine may then transmit a modified survey 416 to the survey engine to present the modified survey 416 to the client application 418.

In other examples, in response to receiving the communication 410 (e.g., an email message sent from Jane Doe's boss on Monday instructing Jane Doe to schedule a meeting with him on Wednesday between 1:00 PM and 2:30 PM) associated with the participant 404 from the data service 402, the responsiveness engine may extract the responsiveness conditions 414 (e.g., a professional subject matter of the prompt to schedule the meeting) from the communication 410. In some examples, the survey application 408 may analyze the responsiveness conditions 414 (e.g., the professional subject matter of the prompt to schedule the meeting) to identify a usage scenario that occurred during a previous time period, which led to the increased likelihood of participation by the participant 404 in the survey. An example of the usage scenario may include the survey application 408 prohibiting, the survey from being provided to the client application 418 during a specific time period (e.g., Wednesday between 1:00 PM and 2:30 PM). The survey application 408 may transmit the modified survey 416 to the survey engine to present the modified survey 416 to the client application 418.

In other examples, the responsiveness engine may receive a calendar associated with the participant 404 from the data service 402. The responsiveness engine may identify busy periods and quiet periods for the participant 404 from the calendar and may determine the responsiveness conditions 414 based on the quiet periods. In response, the responsiveness engine may modify the survey by selecting the time duration to coincide with the quiet periods and may transmit the modified survey to the survey engine to present to the client application.

In some examples, in response to receiving the calendar associated with the participant 404 from the data service 402, the responsiveness engine may identify task items associated with the calendar. The responsiveness engine may extract the responsiveness conditions 414 from the task items. The responsiveness conditions 414 may include the historical usage data 412, a global positioning system (GPS) location, and/or a subject matter associated with the task item, among others. Then, to enhance participation in the survey by the participant 404, the responsiveness engine may modify the survey based on the responsiveness conditions 414 and may transmit the modified survey 416 to the survey engine to present the modified survey 416 to the client application 418.

In other examples, in response to receiving, the calendar associated with the participant 404 from the data service 402, the responsiveness engine may identify task items (e.g., a professional meeting scheduled weekly on Monday between 9:00 AM and 11:00 AM) associated with the calendar. The responsiveness engine may extract the responsiveness conditions 414 (e.g., the GPS location indicating the Smith Building, Room 141 associated with the weekly meeting) from the task items. In some examples, the survey application 408 may analyze the responsiveness conditions 414 (e.g., the GPS location indicating the Smith Building, Room 141 associated with the weekly meeting) to identify a usage scenario that occurred during a previous time period, which led to the increased likelihood of participation by the participant 404 in the survey. An example of the usage scenario may include the survey application 408 prohibiting the survey from being provided to the client application 418 during a specific time period (e.g., Monday between 9:00 AM and 11:00 AM). The survey application 408 may transmit the modified survey 416 to the survey engine to present the modified survey 416 to the client application 418.

The example scenarios and schemas in FIG. 1 through FIG. 4 are shown with specific components, data types, and configurations. Embodiments are not limited to systems according to these example configurations. Determining an optimal responsiveness for accurate surveying may be implemented in configurations employing fewer or additional components in applications and user interfaces. Furthermore, the example schema and components shown in FIG. 1 through FIG. 4 and their subcomponents may be implemented in a similar manner with other values using the principles described herein.

Figure 5:
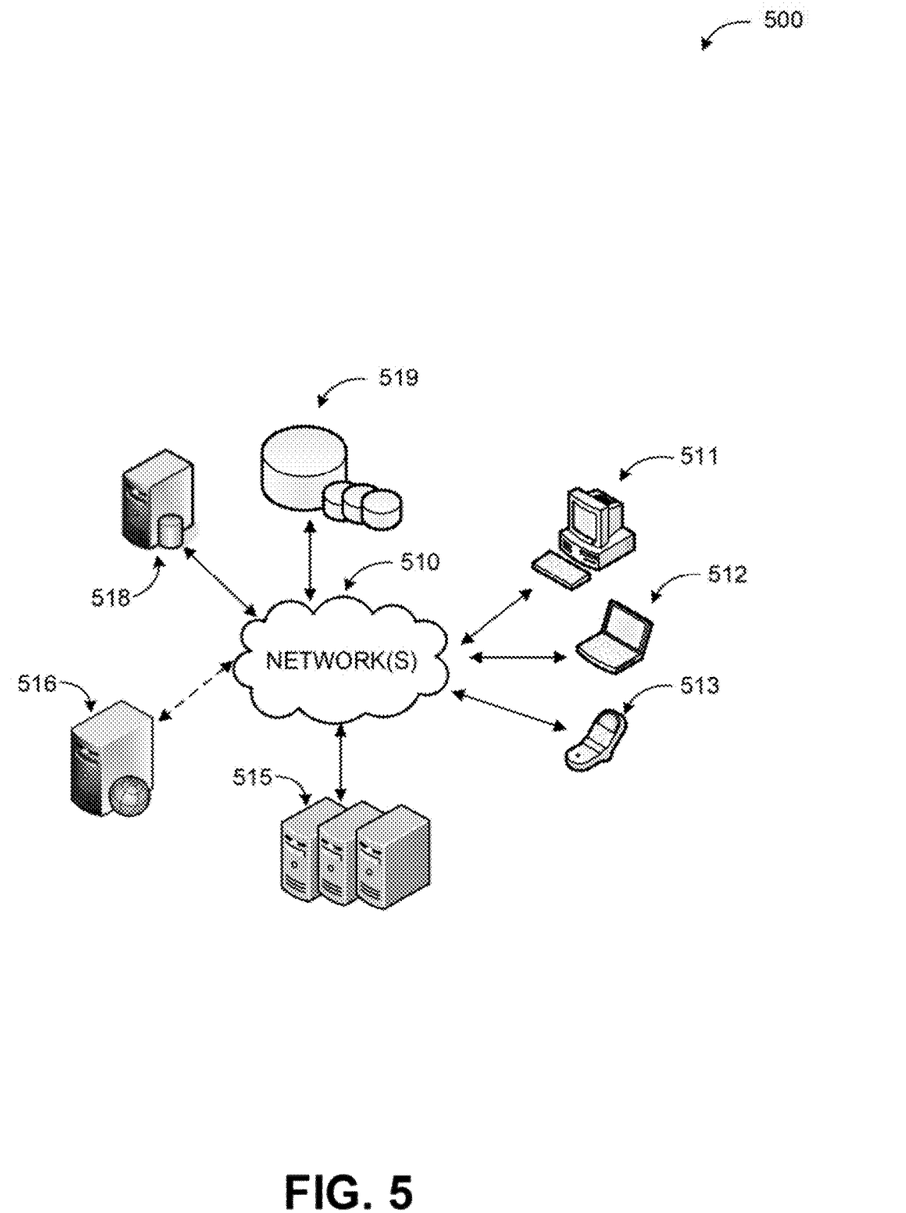
FIG. 5 is a simplified networked environment, where a system according to embodiments may be implemented.

FIG. 5 is a simplified networked environment, where a system according to embodiments may be implemented.

As shown in a diagram 500, a survey may be provided to a client application executed on a computing device. The survey may be associated with a participant. The computing device may execute a survey application. In examples, a data service may be implemented via software executed over servers 515. The platform may communicate with client applications on individual computing devices such as a smart phone 513, a mobile computer 512, or desktop computer 511 ('client devices') through network(s) 510. The servers 515 may include one or more data servers 516, where at least one of the one or more of the data servers 516 may be configured to execute one or more applications (i.e. the survey application) associated with a data service.

In other examples, the data service may be provided by a third party service or may include a web application. The data service may store survey data associated with surveys in a data store 519 directly or through a database server 518. Client applications executed on client devices 511-513 may be enabled to receive the survey data and render a communication interface displaying information associated with captured surveys.

Client applications executed on any of the client devices 511-513 may facilitate communications via application(s) executed by the one or more data servers 516, or on an individual data server. An application, such as the survey application, may receive a request to present a survey to a participant. The survey application may request and receive contextual data associated with the participant in relation to the survey from a data service. The contextual data may be analyzed to identify responsiveness conditions to increase a likelihood of participation by the participant in the survey. The responsiveness conditions may include a time duration. The survey may be provided to a client application associated with the participant to prompt the client application to initiate the survey at the time duration. The survey application may store the survey data associated with the search results in the data store 519 directly or through database server 518.

The network(s) 510 may comprise any topology of servers, clients, Internet service providers, and communication media. A system according to embodiments may have a static or dynamic topology. The network(s) 510 may include secure networks such as an enterprise network, an unsecure network such as a wireless open network, or the Internet. The network(s) 510 may also coordinate communication over other networks such as Public Switched Telephone Network (PSTN) or cellular networks. Furthermore, the network(s) 510 may include short range wireless networks such as Bluetooth or similar ones. The network(s) 510 provide communication between the nodes described herein. By way of example, and not limitation, the network(s) 510 may include wireless media such as acoustic, RF, infrared and other wireless media.

A textual scheme, a graphical scheme, an audio scheme, an animation scheme, a coloring scheme, a highlighting scheme, and/or a shading scheme may be employed to distinguish local search results from remote search results. Additionally, the schemes may be employed to distinguish attributes associated with the local search results from attributes associated with the remote search results.

Many other configurations of computing devices, applications, data sources, and data distribution systems may be employed for determining an optimal responsiveness for accurate surveying. Furthermore, the networked environments discussed in FIG. 5 are for illustration purposes only. Embodiments are not limited to the example applications, modules, or processes.

Figure 6:
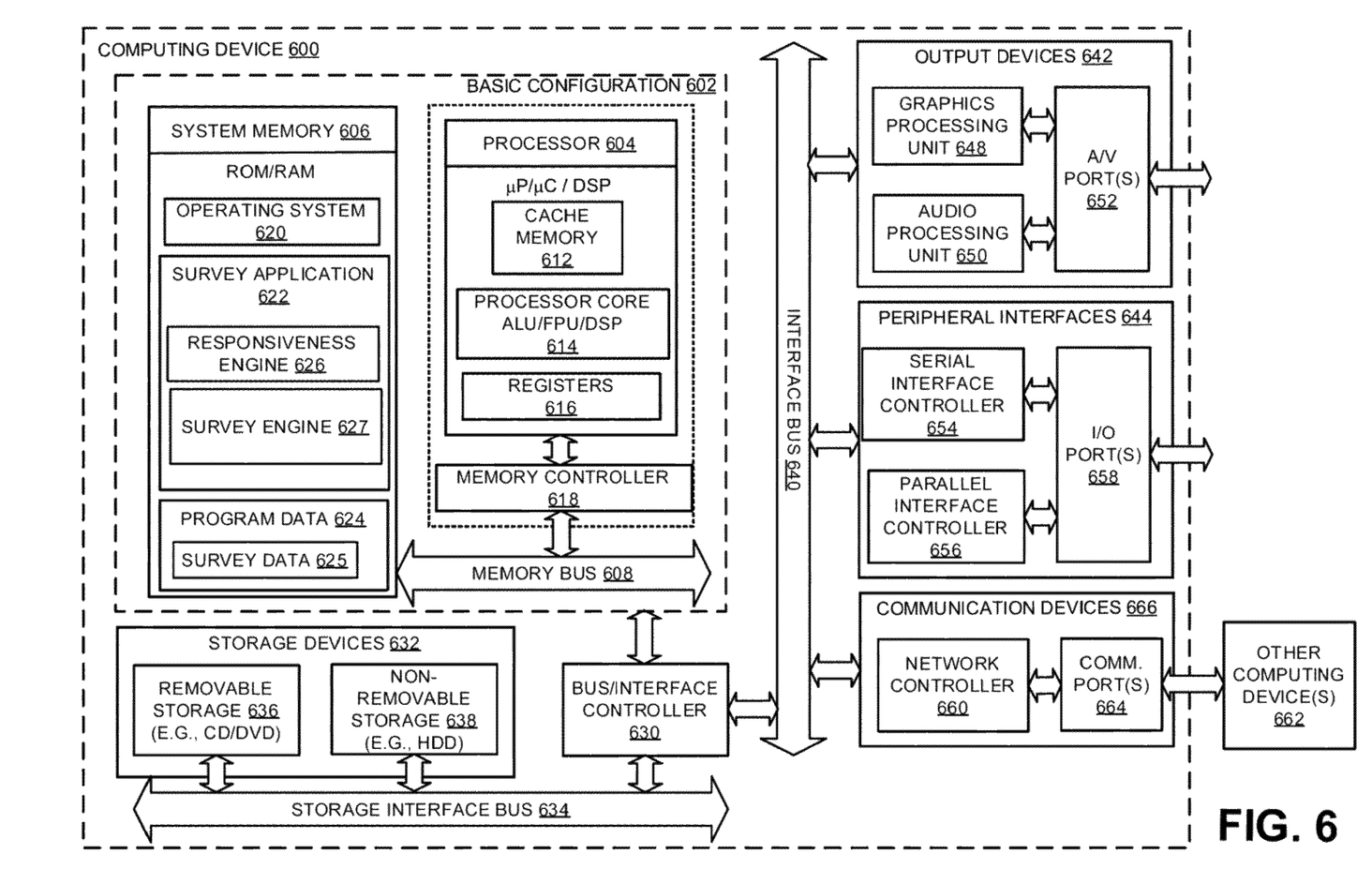
FIG. 6 is a block diagram of an example computing, device, which may be used for determining an optimal responsiveness for accurate surveying, according to embodiments.

FIG. 6 is a block diagram of an example computing device, which may be used for determining an optimal responsiveness for accurate surveying, according to embodiments.

For example, a computing device 600 may be used as a server, desktop computer, portable computer, smart phone, special purpose computer, or similar device. In an example basic configuration 602, the computing device 600 may include one or more processors 604 and a system memory 606. A memory bus 608 may be used for communication between the processor 604 and the system memory 606. The example basic configuration 602 may be illustrated in FIG. 5 by those components within the inner dashed line.

Depending on the desired configuration, the processor 704 may be of any type, including but not limited to a microprocessor (µP), a microcontroller (µC), a digital signal processor (DSP), or any combination thereof. The processor 604 may include one more levels of caching, such as a level cache memory 612, one or more processor cores 614, and registers 616. The one or more processor cores 614 may (each) include an arithmetic logic unit (ALU), a floating point unit (FPU), a digital signal processing core (DSP Core), or any combination thereof. An example memory controller 618 may also be used with the processor 604, or in some implementations, the example memory controller 61 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a survey application 622, and a program data 624. The survey application 622 may include a responsiveness engine 626 and a survey engine 627, among others. The responsiveness engine 626 may be configured to receive a request to present a survey to a participant. The responsiveness engine 626 may also request and receive contextual data associated with the participant in relation to the survey from a data service. The responsiveness engine 626 may also analyze the contextual data to identify responsiveness conditions to increase a likelihood of participation by the participant in the survey. The responsiveness conditions may include a time duration. The survey engine 627 may provide the survey to a client application associated with the participant to prompt the client application to initiate the survey at the time duration. The program data 624 may also include, among other data, such as survey data 625, and other information related to the survey, as described herein.

The computing device 600 may have additional features or functionality, and additional interfaces to facilitate communications between the example basic configuration 602 and any desired devices and interfaces. For example, a bus/interface controller 630 may be used to facilitate communications between the example basic configuration 602 and one or more data storage devices 632 via a storage interface bus 634. The data storage devices 632 may be one or more removable storage devices 636, one or more non-removable storage devices 638, or a combination thereof. Examples of the removable storage and the non-movable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 646) to the example basic configuration 602 via the bus/interface controller 630. Some of the one or more output devices 642 include a graphics processing unit 648 and an audio processing unit 650, which may be configured to communicate to various external devices such as a display or speakers via one or more A/V ports 652. The one or more peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc) via one or more I/O ports 658. An example communication device 666 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a pan of a general purpose or specialized server, mainframe, or similar computer, which includes any of the above functions. The computing device 600 may also be implemented as a personal computer including both laptop computer and non-laptop computer configurations.

Example embodiments may also include methods for determining an optimal responsiveness for accurate surveying. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
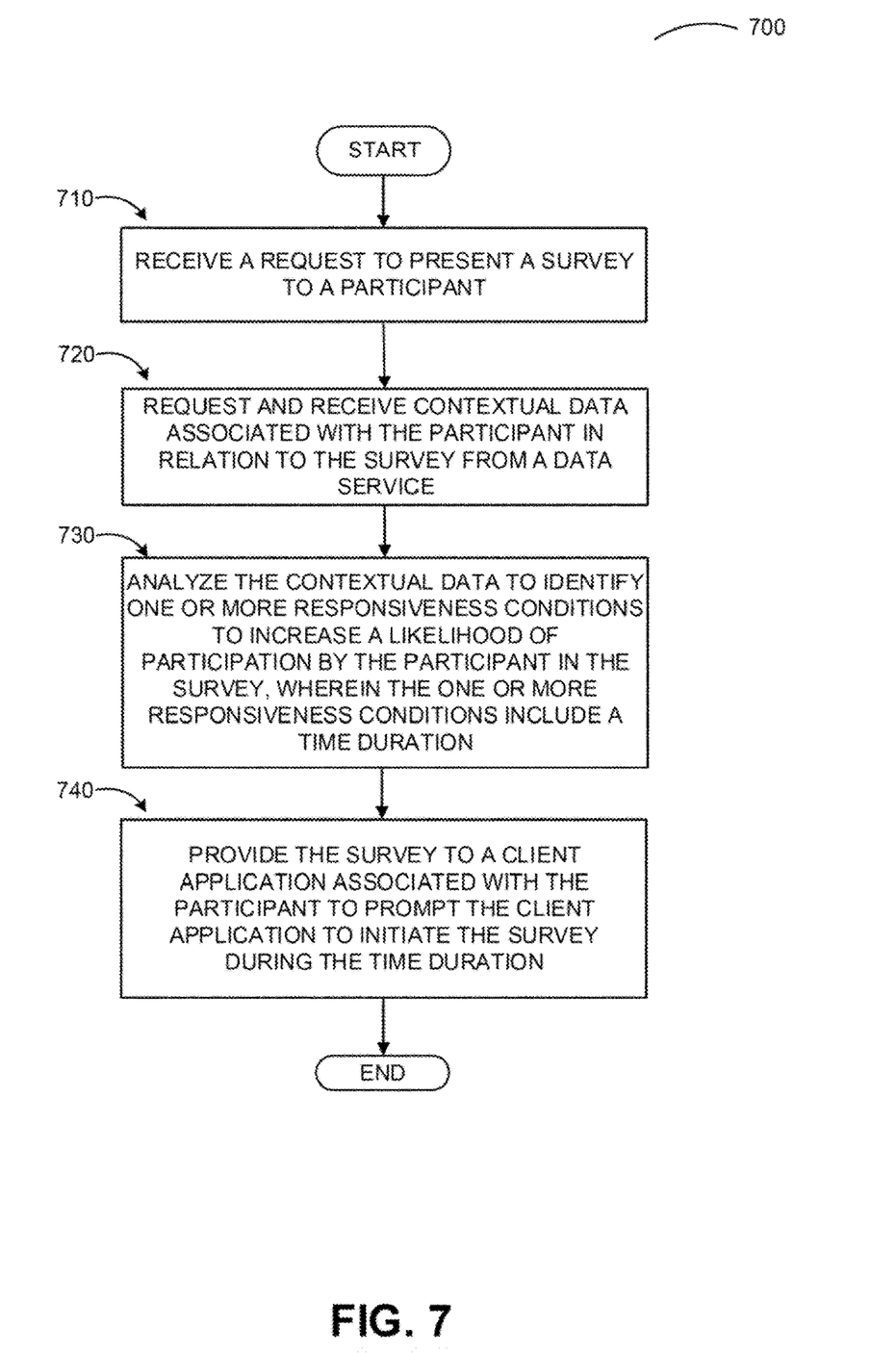
FIG. 7 is a logic flow diagram illustrating a process for determining an optimal responsiveness for accurate surveying, according to embodiments.

FIG. 7 is a logic flow diagram illustrating a process for determining an optimal responsiveness for accurate surveying, according to embodiments.

A process 700 may be implemented on a computing device, such as the computing device 600, or with another system. The computing device 600 may include a display device, such as a touch enabled display component, and a monitor, among others, to provide the survey application to the participant. The process 700 begins with operation 710, where the survey application may receive a request to present a survey to a participant.

At operation 720, the survey application may request and receive contextual data associated with the participant in relation to the survey from a data service. The contextual data may include an identification of the participant, a credential associated with the participant, an organization associated with the participant, and/or a job title of the participant, among other examples. In other examples, the survey application may request and receive communications associated with the participant in relation to the survey from the data service. The communications may include entails, online calendar invites, attachments associated with the mails, and/or text messages, among others.

At operation 730, the survey application may analyze the contextual data to identify responsiveness conditions to increase a likelihood of participation by the participant in the survey. The responsiveness conditions may include a time duration and/or a historical usage, among others. At operation 740, the survey application may provide the survey to a client application associated with the participant to prompt the client application initiate the survey at the time duration.

The operations included in process 700 are for illustration purposes. Determining an optimal responsiveness for accurate surveying may be implemented by similar processes with fewer or additional steps, as well as in different order of operations using the principles described herein. The operations described herein may be executed by one or more processors operated on one or more computing, devices, one or more processor cores, specialized processing devices, and/or general purpose processors, among other examples.

According to some embodiments, a means torr determining an optimal responsiveness for accurate surveying may be described, which may include a means for receiving a request to present a survey to a participant, a means for requesting and receiving contextual data associated with the participant in relation to the survey from a data service, and a means for analyzing the contextual data to identify responsiveness conditions to increase a likelihood of participation by the participant in the survey. The responsiveness conditions may include a time duration. The means for determining an optimal responsiveness for accurate surveying may additionally include a means for providing, the survey to a client application associated with the participant to prompt the client application to initiate the survey during the time duration.

According to some embodiments, computing devices for determining an optimal responsiveness for accurate surveying are described. An example computing device may include a memory and processors coupled to the memory. The processors may execute a survey application in conjunction with instructions stored in the memory. The survey application may include a responsiveness engine and a survey engine. The responsiveness engine may be configured to receive a request to present a survey to a participant, request and receive contextual data associated with the participant in relation to the survey from a data service, and analyze the contextual data to identify responsiveness conditions to increase a likelihood of participation by the participant in the survey. The responsiveness conditions may include a time duration. The contextual data may include an identification of the participant, a credential associated with the participant, an organization associated with the participant, and/or a job title of the participant, among others. The survey engine may be configured to provide the survey to a client application associated with the participant to prompt the client application to initiate the survey during the time duration.

According to additional embodiments, the responsiveness engine may be further configured to receive a calendar associated with the participant from the data service. The responsiveness engine may identify task items associated with the calendar and may extract the responsiveness conditions from the task items. The responsiveness conditions may include historical usage data. The responsiveness engine may then modify the survey based on the responsiveness conditions and may transmit the modified survey to the survey engine to present to the client application.

According to other embodiments, the responsiveness engine may be further configured to receive a communication associated with the participant from the data service. In response, the responsiveness engine may extract the responsiveness conditions from the communication. The responsiveness conditions may include historical usage data. The responsiveness engine may modify the survey based on the responsiveness conditions and may transmit the modified survey to the survey engine to present to the client application.

According to some embodiments, the responsiveness engine may be further configured to receive a task item associated with the participant from the data service. In response, the responsiveness engine may extract the responsiveness conditions from the task item. The responsiveness conditions may include a global positioning system (GPS) location. The responsiveness engine may then modify the survey based on the responsiveness conditions and then transmit the modified survey to the survey engine to present to the client application.

According to other embodiments, the responsiveness engine may be further configured to receive a communication associated with the participant from the data service. In response, the responsiveness engine may extract the responsiveness conditions from the communication. The responsiveness conditions may include a global positioning system (GPS) location. The responsiveness engine may modify the survey based on the responsiveness conditions and may transmit the modified survey to the survey engine to present to the client application.

According to some embodiments, the responsiveness engine may receive a communication associated with the participant from the data service. In response, the responsiveness engine may extract the responsiveness conditions from the communication. The responsiveness conditions may include a tone of exchange within the communication. The responsiveness engine may modify the survey based on the responsiveness conditions and may transmit the modified survey to the survey engine to present to the client application.

According to additional embodiments, the responsiveness engine may receive a communication associated with the participant from the data service and may extract the responsiveness conditions from the communication. The responsiveness conditions may include a subject matter associated with the communication. The responsiveness engine may modify the survey based on the responsiveness conditions and may transmit the modified survey to the survey engine to present to the client application.

According to other embodiments, the responsiveness engine may receive a calendar associated with the participant from the data service. The responsiveness engine may then identify busy periods and quiet periods for the participant from the calendar. In response to determining the responsiveness conditions based on the quiet periods, the responsiveness engine may modify the survey by selecting the time duration to coincide with the quiet periods and then may transmit the modified survey to the survey engine to present to the client application.

According to some examples, the responsiveness engine may receive a calendar associated with the participant from the data service. The responsiveness engine may identify task items associated with the calendar and may extract the responsiveness conditions from the task items. The responsiveness conditions may include a subject matter associated with the task items. The responsiveness engine may modify the survey based on the responsiveness conditions and may transmit the modified survey to the survey engine to present to the client application. According to other examples, the responsiveness engine may perform a statistical computation on the responsiveness conditions to predict an accuracy of a response to the survey.

According, to some embodiments, methods executed on a computing device for determining an optimal responsiveness for accurate surveying may be provided. An example method may include process steps, such as, receiving a request to present a survey to a participant and requesting and receiving contextual data associated with the participant in relation to the survey from a data service. The contextual data may include an identification of the participant, a credential associated with the participant, an organization associated with the participant, and/or a job title of the participant, among others. The process steps may further include analyzing the contextual data to identify responsiveness conditions to increase a likelihood of participation by the participant in the survey. The responsiveness conditions may include a time duration. The process steps may also include providing the survey to a client application associated with the participant to prompt the diem application to initiate the survey during the time duration.

According to other embodiments, the process steps may further include detecting the credential associated with the participant, comparing the credential to a predefined rule, and detecting a match between the credential and the predefined rule. In response to detecting the mach between the credential and the predefined rule, the process steps may further include identifying the participant as an administrator, contacting the participant to prompt the participant to modify the time duration associated with an initiation of the survey, receiving a request from the participant to apply a modification to the time duration to initiate the survey, and applying the modification of the time duration.

According to some embodiments, the process steps may further include receiving another request to present another survey to another participant, receiving other contextual data associated with the other participant in relation to the other survey from the data service, identifying the contextual data and the other contextual data as sharing a subset of attributes, and analyzing the other contextual data to identify the responsiveness conditions to increase the likelihood of participation in the other survey. The responsiveness conditions may include another time duration. The process steps may additionally include providing the other survey to the client application associated with the other participant to prompt the client application to initiate the other survey during the other time duration.

According to other embodiments, the process steps may also include receiving crowd-sourced data from sources, analyzing the crowd-sourced data to identify the responsiveness conditions to increase the likelihood of participation by the participant in another survey, and providing the other survey to the client application to prompt the client application to initiate the other survey. The other survey may include the crowd-sourced data.

According to some examples, computer-readable memory devices with instructions stored thereon for determining an optimal responsiveness for accurate surveying may be provided. The instructions may include receiving a request to present a survey to a participant and requesting and receiving contextual data associated with a participant in relation to the survey from a data service. The contextual data may include an identification of the participant, a credential associated with the participant, an organization associated with the participant, and/or a job title of the participant, among others. The instructions may further include analyzing the contextual data to identify responsiveness conditions to increase the likelihood of participation by the participant in the survey. The responsiveness conditions may include a time duration. The instructions may further include providing the survey to a client application associated with the participant to prompt the client application to initiate the survey during the time duration.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device to determine an optimal responsiveness for accurate surveying, the computing device comprising:
   a memory; and
   one or more processors coupled to the memory, the one or more processors executing a survey application in conjunction with instructions stored in the memory, wherein the one or more processors are configured to:
   receive a request to present a survey to a participant;
   request and receive contextual data associated with the participant from a data service, wherein the contextual data includes an electronic communication sent or received by the participant over a network;
   identify a time period during which a likelihood of participation by the participant in the survey is increased based on the contextual data, wherein the time period is identified based on participant availability determined based on global positioning system (GPS) location data extracted from the electronic communication; and
   provide the survey to a client application associated with the participant to prompt the client application to initiate the survey during the identified time period.

2. The computing device of claim 1, wherein the one or more processors are further configured to identify the time period
   based on at least one of a task and a calendar associated with the participant.

3. The computing device of claim 1 wherein the one or more processors are further configured to:
   extract second global positioning system (GPS) location data from a task associated with the participant and identify the time period based on the second GPS location data.

4. The computing device of claim 1, wherein the one or more processors are further configured to identify the time period by
   extracting a tone of exchange within the electronic communication.

5. The computing device of claim 1, wherein the one or more processors are further configured to identify the time period
   based on subject matter associated with the electronic communication.

6. The computing device of claim 1, wherein the one or more processors are further configured to:
   identify one or more busy periods and quiet periods for the participant from a calendar associated with the participant; and
   identify the time period during which the likelihood of participation by the participant in the survey is increased based on the one or more quiet periods.

7. The computing device of claim 1, wherein the one or more processors are further configured to identify the time period:
   based on subject matter associated with a task associated with the participant.

8. The computing device of claim 1, wherein the one or more processors are further configured to:
   perform a statistical computation on the time period to predict an accuracy of a response to the survey.

9. The computing device of claim 1, wherein the contextual data further includes one or more of an identification of the participant, a credential associated with the participant, an organization associated with the participant, and a job title of the participant.

10. A method executed on a computing device including one or more processors to determine an optimal responsiveness for accurate surveying, the method comprising:
    receiving, with the one or more processors, a request to present a survey to a participant;
    requesting and receiving, with the one or more processors, contextual data associated with the participant in relation to the survey from a data service, wherein the contextual data includes one or more of an identification of the participant, a credential associated with the participant, an organization associated with the participant, and a job title of the participant and wherein the contextual data includes an electronic communication sent or received by the participant over a network;
    identifying, with the one or more processors based on the contextual data, a time period during which a likelihood of participation by the participant in the survey is increased, wherein the time period is identified based on global positioning system (GPS) location data extracted from the electronic communication sent or received by the participant; and
    providing, with the one or more processors, the survey to a client application associated with the participant to prompt the client application to initiate the survey during the identified time period.

11. The method of claim 10, further comprising:
    detecting, with the one or more processors, the credential associated with the participant;
    comparing, with the one or more processors, the credential to a predefined rule; and
    detecting, with the one or more processors, a match between the credential and the predefined rule.

12. The method of claim 11, further comprising:
    identifying, with the one or more processors, the participant as an administrator;
    contacting, with the one or more processors, the participant to prompt the participant to modify the time period associated with an initiation of the survey;
    receiving, with the one or more processors, a request from the participant to apply a modification to the time period to initiate the survey; and
    applying, with the one or more processors, the modification of the time period.

13. The method of claim 10, further comprising:
    receiving, with the one or more processors, another request to present another survey to another participant;
    receiving, with the one or more processors, other contextual data associated with the other participant in relation to the other survey from the data service; and identifying, with the one or more processors, the contextual data and the other contextual data as sharing a subset of attributes.

14. The method of claim 13, further comprising:
identifying, with the one or more processors, based on the other contextual data, the one or more responsiveness conditions to increase the likelihood of participation in the other survey, wherein the one or more responsiveness conditions include another time period; and
providing, with the one or more processors, the other survey to the client application associated with the other participant to prompt the client application to initiate the other survey during the other time period.

15. The method of claim 10, further comprising:
receiving, with the one or more processors, crowd-sourced data from one or more sources;
identifying, with the one or more processors, based on the crowd-sourced data, the one or more responsiveness conditions to increase the likelihood of participation by the participant in another survey; and
providing, with the one or more processors, the other survey to the client application to prompt the client application to initiate the other survey, wherein the other survey includes the crowd-sourced data.

16. A non-transitory computer-readable memory storage device with instructions stored thereon to determine an optimal responsiveness for accurate surveying, the instructions comprising:
receiving a request to present a survey to a participant;
requesting and receiving contextual data associated with a participant in relation to the survey from a data service, wherein the contextual data includes one or more of an identification of the participant, a credential associated with the participant, an organization associated with the participant, and a job title of the participant and wherein the contextual data includes an electronic communication sent or received by the participant over a network;
identifying, based on the contextual data, a time period during which a of participation by the participant in the survey is increased, wherein the time period is identified on participant availability determined based on global positioning system (GPS) location data extracted from the electronic communication sent or received by the participant;
providing the survey to a client application associated with the participant to prompt the client application to initiate the survey during the identified time period.

17. The non-transitory computer-readable memory storage device of claim 16, wherein the instructions further comprise:
detecting the credential associated with the participant;
comparing the credential to a predefined rule;
detecting a match between the credential and the predefined rule;
identifying the participant as an administrator;
contacting the participant to prompt the participant to modify the time period associated with an initiation of the survey;
receiving a request from the participant to apply a modification to the time period to initiate the survey; and
applying the modification of the time period.

18. The non-transitory computer-readable memory storage device of claim 16, wherein the instructions further comprise:
modifying the survey based on historical usage data; and
transmitting the modified survey to present to the client application.

* * * * *